Aug. 23, 1932.   C. CONE   1,872,684
PROCESS AND APPARATUS FOR PRODUCING SHEET GLASS
Filed Dec. 7, 1928   2 Sheets-Sheet 1
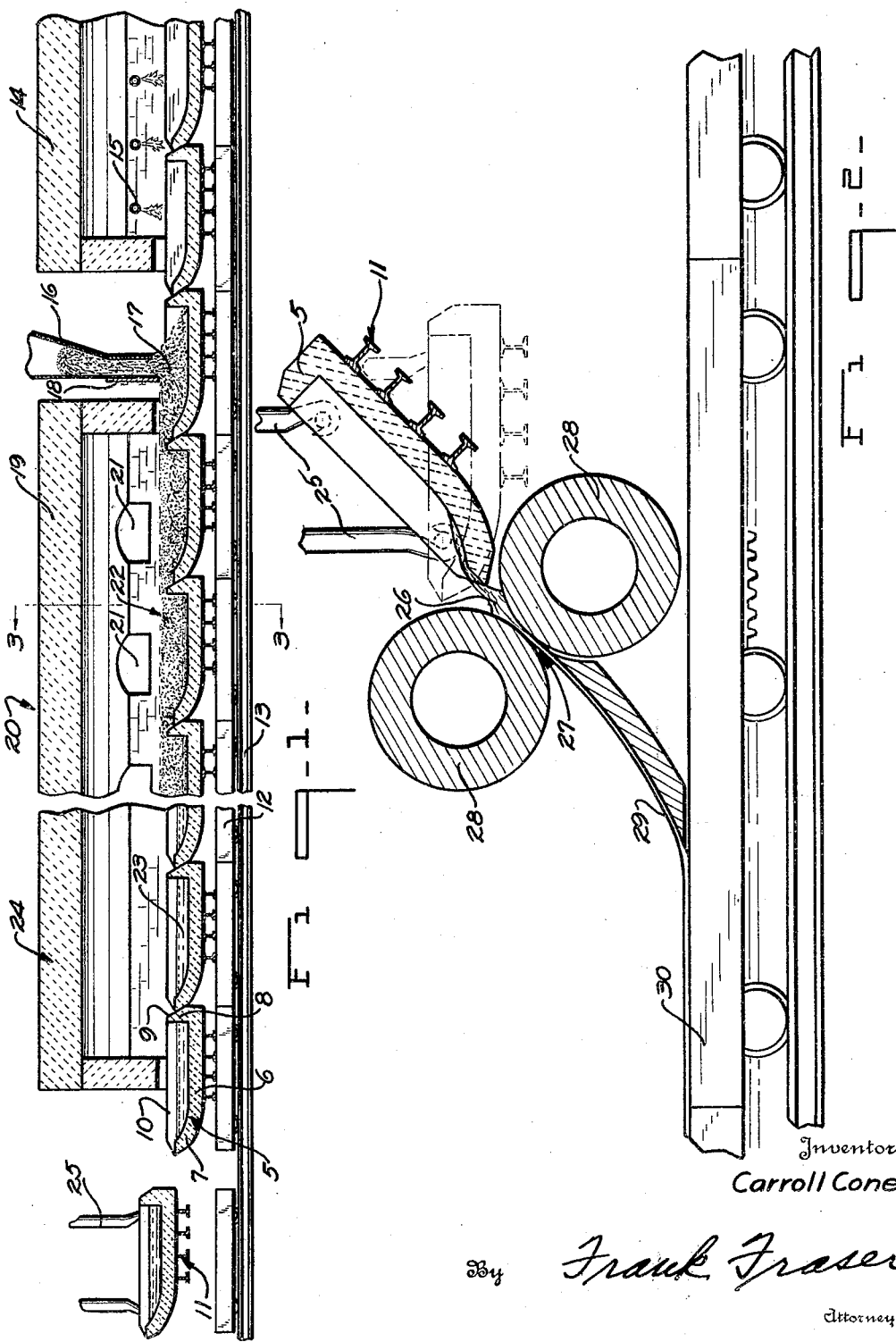
Inventor
Carroll Cone
By Frank Fraser
Attorney

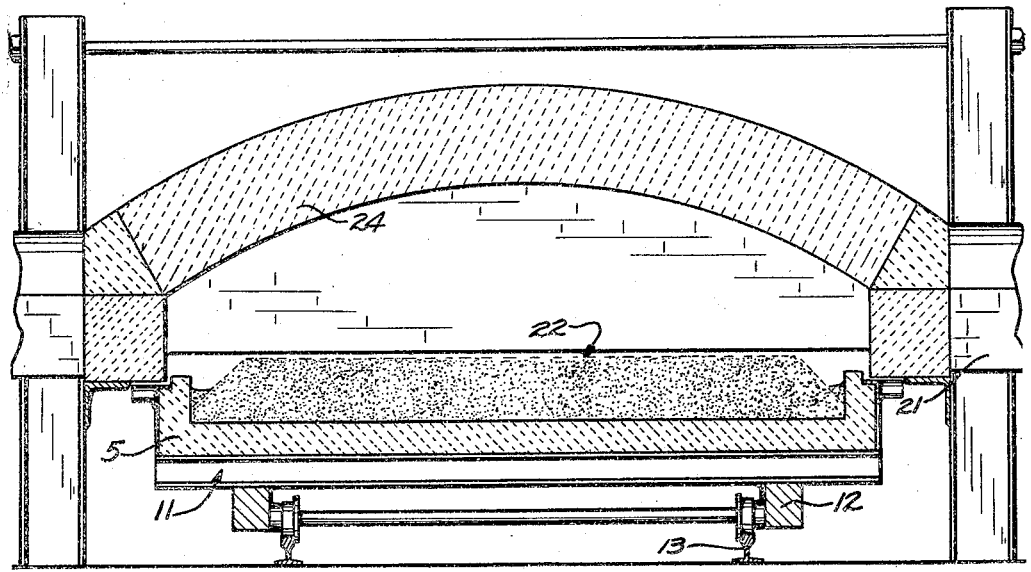
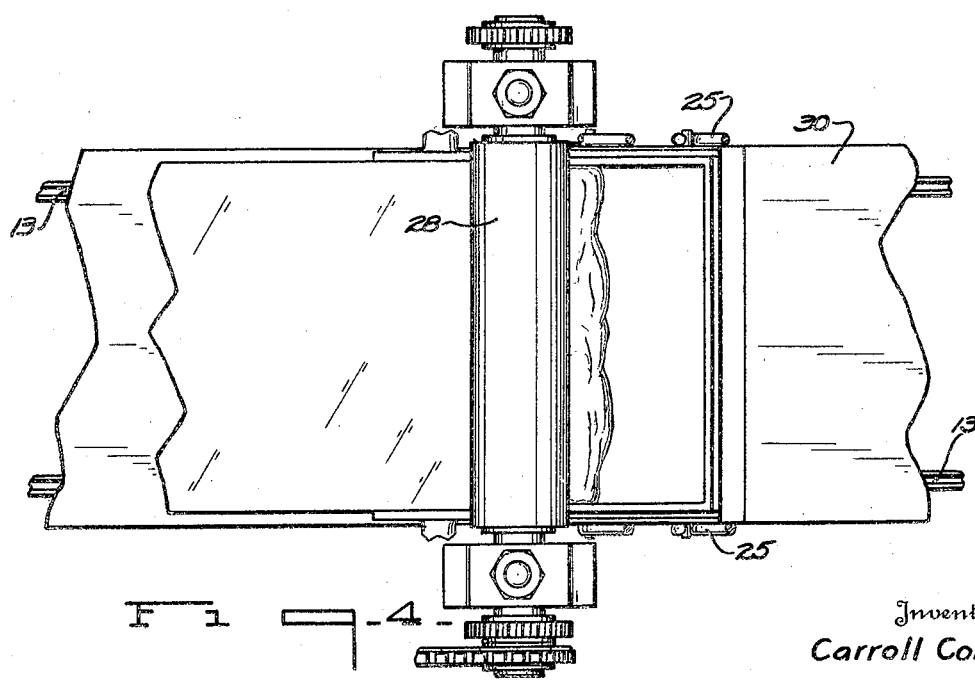

Patented Aug. 23, 1932

1,872,684

UNITED STATES PATENT OFFICE

CARROLL CONE, OF TOLEDO, OHIO, ASSIGNOR TO LIBBEY-OWENS-FORD GLASS COMPANY, OF TOLEDO, OHIO, A CORPORATION OF OHIO

PROCESS AND APPARATUS FOR PRODUCING SHEET GLASS

Application filed December 7, 1928. Serial No. 324,357.

The present invention relates to a process and apparatus for producing sheet glass, and particularly to an improved method and apparatus for melting and refining the molten glass to make it suitable for sheet glass use.

An important object of the invention is to provide a process and apparatus for producing molten glass wherein a plurality of receptacles containing suitable glass batch ingredients are adapted to be moved in substantially end to end relation through a furnace or the like in a manner to produce a plurality of pools or masses of properly refined molten glass.

Another object of the invention is to provide such means wherein a plurality of pot-like receptacles containing suitable batch ingredients are adapted to be moved through a furnace or the like in a manner that the batch ingredients will be reduced to molten glass and then properly refined so that a plurality of preferably separated pools of molten glass will be produced whereby, after the glass has been suitably refined, the receptacles can be removed one at a time and the molten glass used therefrom.

A still further object of the invention is to provide such means whereby a plurality of preferably separated pools or masses of molten glass may be produced with a continuous type furnace in a manner that, although the pools move as a body, the molten glass is actually in a quiescent state during the melting and refining thereof.

Other objects and advantages of the invention will become more apparent during the course of the following description when taken in connection with the accompanying drawings.

In the drawings wherein like numerals are employed to designate like parts throughout the same, Fig. 1 is a vertical longitudinal section through a portion of my improved apparatus, Fig. 2 is a vertical longitudinal section showing the formation of a sheet of glass, Fig. 3 is a section taken on line 3—3 in Fig. 1, and Fig. 4 is a plan view of the sheet forming mechanism.

Referring to the drawings, the numeral 5 is used to designate a plurality of receptacles or pots. Although the shape of the pot illustrated is satisfactory for use in the manner intended, it will, of course, be appreciated that the contour of the pots can be varied as desired. The pots shown are so shaped that they constitute a substantially flat bottom 6 terminating at one end in an upwardly curved lip 7. At the opposite end, the upstanding wall 8 is provided and has an inclined surface 9 formed at substantially the same angle as the lip 7. This is clearly shown in Fig. 1, and it will be noted that the lip end of one receptacle will fit snugly against the inclined surface 9 of an adjacent receptacle. Side walls 10 serve to complete the enclosure.

The pots or receptacles 5 may be supported in any suitable manner such as by the cradle, designated in its entirety by the numeral 11, which cradle may, in turn, be detachably supported upon and conveyed by the trucks 12. The trucks 12 are provided with wheels adapted to be run on the tracks 13. To produce molten glass, a series of the pots 5 are arranged in the cradles 11 supported by the trucks 12, the trucks and pots being placed in end to end relation, creating, in effect, a continuous receptacle as shown.

To the right in Fig. 1 is illustrated diagrammatically a preheating chamber 14, through which the pots may be passed before glass batch ingredients are placed therein, suitable temperature control means 15 being associated with the preheating chamber 14 to bring the pots 5 to the proper temperature. The pots are then carried beneath a batch chute 16 or other conveying apparatus having connection with a suitable source of supply whereby the batch ingredients 17 may be discharged into the pots. An adjustable gauge member 18 is preferably associated with the batch chute to control the height of the batch mass in the pots in such a way as to control the amount of batch ingredients supplied to the individual pots. The pots are then carried forward into the melting end 19 of the furnace 20.

The numerals 21 designate the ports of the furnace 20, which furnace may be heated by means of the well known regenerative type system, recuperative type system, etc. As the unmelted batch requires or at least takes up more space than the molten glass produced therefrom, the batch line 22 at the intake end 8 of the furnace may be higher than the end and side walls of the pots 8. As the pots are advanced through the melting end of the furnace 20, the high temperatures present therein reduce the batch ingredients to molten glass. As the batch melts, it settles down into the pots so that separate individual pools of molten glass 23 will be contained in the various pots as indicated to the left of Fig. 1. It is preferred that the batch line 22 be initially sufficiently high that a single batch fill only will be required to give the desired amount of molten glass in each of the pots 5. On the other hand, the batch ingredients may be furnished to the pots in a number of stages. The numeral 24 designates the refining end of the furnace 20 where the temperatures are so controlled that the molten glass will be properly refined when leaving the furnace. Although the molten glass is conveyed in movable pots 5 while in the furnace, nevertheless the pools themselves are in a quiescent state as none of the molten glass is being removed from the pots during the melting and refining operations. In fact, the movement of the pots through the furnace is relatively so slow as to cause very little, if any, agitation of the molten glass. In any event, the size of the body of molten glass and the temperature and time cycles are so controlled that the molten glass will be completely refined when the pots leave the furnace. As the pots leave the furnace, crane means 25 may be employed to lift the cradle 11 and pot and convey the same to a sheet forming apparatus.

In Fig. 2 is illustrated one form of such apparatus, and it will be seen by the dotted lines that the pot is carried in a substantially horizontal plane during the transfer thereof from the furnace to the sheet forming mechanism. When in proximity to the forming mechanism, the pot may be tilted in a manner to cause the molten glass 26 to flow therefrom over the lip 7 to the sheet forming pass 27 created between the forming rolls 28. It will be noted in Fig. 3 that the pots are of considerable width and it may be desirable to make the width of the pot and the length of the rolls 28 substantially the same so that a relatively uniform flow of molten glass will be supplied to the sheet forming pass 27. This arrangement has numerous and distinct advantages over the ordinary cylindrical type of pot whose diameter is considerably less than the length of sheet forming rolls used. The possibility of overlapping of the glass and other faults ordinarily encountered are greatly minimized by the use of my improved pots. The molten glass 26 is reduced to the sheet 29 when passing through the sheet forming pass 27. The sheet may then be deposited upon the tables 30 or any other suitable conveyor and taken to the annealing leer as will be understood by those versed in the art.

It will be noted that as one pot leaves the furnace 20, another one is being introduced at the opposite end so that there is at all times a continuous flow of pots through the furnace. The length of the furnace and speed of movement can be so controlled that there will always be a pot of glass issuing from the furnace containing molten glass properly conditioned and ready for use. Although the preheating of the pots in the chamber 14 is not absolutely necessary, I consider it desirable because it cuts down the heat loss and time required in the furnace 20. The formation of glass in the pots or receptacles illustrated has a distinct advantage over molten glass produced in an ordinary continuous tank furnace. Although the glass produced in the pots 5 may be considered to have been produced continuously, nevertheless the molten glass is made in separated pools, each being contained in an individual receptacle. There is very little, if any, flow movement of the glass during its handling in the furnace 20 so that proper settling and refining of the glass will take place in the pots 5 as readily as in the old type of cylindrical pots.

Attention is directed to the fact that it is not essential to the successful operation of this invention that the receptacles or pots 5 be in continuous state of movement while in the furnace, because it may be desirable at times to stop the trucks with the pots thereon while in the furnace, thereby permitting the use of a proportionately shorter furnace. Claims directed to the combination of the molten glass producing means and the sheet forming means are contained in my copending application Serial No. 334,654, filed January 24, 1929.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing molten glass, consisting in arranging a plurality of receptacles in substantially end to end relation, filling the same with glass batch ingredients in a manner that the batch line will be in a relatively higher plane than the end walls of the receptacles, and applying heat thereto in a manner to reduce the batch ingredients to molten glass, the height of the batch line being so controlled that the molten glass when formed will become divided into a plurality of separate pools of molten glass contained in said receptacles.

2. The process of producing molten glass, consisting in arranging a plurality of receptacles in substantially end to end relation, filling the same with glass batch ingredients in a manner that the batch line will be in a relatively higher plane than the end walls of the receptacles, applying heat thereto in a manner to reduce the batch ingredients to molten glass, the height of the batch line being so controlled that the molten glass when formed will become divided into a plurality of separate pools of molten glass contained in said receptacles, and maintaining the pools of glass in a quiescent state and refining the same.

3. Apparatus for producing molten glass, comprising a furnace, a plurality of receptacles adapted to be arranged in substantially end to end relation, support means for the receptacles arranged to convey the receptacles through the furnace, and heating means associated with the furnace, each receptacle having a curved lip portion and an end provided with an inclined surface so arranged that the curved lip portion of one receptacle will fit snugly against the inclined surface of an adjacent receptacle.

4. The process of producing molten glass, consisting in arranging a plurality of receptacles so that adjacent ends thereof abut one another, filling the receptacles with glass batch ingredients in a manner that the batch line will be in a relatively higher plane than the end walls of the receptacle, moving the receptacles through a furnace to first melt the batch ingredients to produce molten glass, the height of the batch line being so controlled that the molten glass when formed will settle into the receptacles in a manner to create a plurality of separate pools, each pool being contained in a receptacle, and then passing the receptacles onward through the furnace to refine the molten glass.

5. The process of producing molten glass, consisting in arranging a plurality of receptacles so that the end of one receptacle will overlie a portion of the adjacent receptacle, filling said receptacles with glass batch ingredients, and then moving the receptacles through a furnace to first melt the batch ingredients to produce molten glass and to then refine the molten glass, the level of the batch line being so controlled that it will be in a relatively higher plane than the end walls of the receptacles, the glass when melted settling into the receptacles so that individual pools of molten glass are created, each pool of glass being contained in its respective receptacle.

6. Apparatus for producing molten glass comprising a furnace, a plurality of receptacles adapted to be arranged in end to end relation so that the end of one receptacle will overlie a portion of the adjacent receptacle, means for supporting and conveying the receptacles through the furnace, and heating means associated with said furnace.

7. Apparatus for producing molten glass comprising a furnace, a plurality of receptacles adapted to be arranged in end to end relation so that the end of one receptacle will overlie a portion of the adjacent receptacle, means for supporting and conveying the receptacles through the furnace, heating means associated with said furnace, and means for introducing batch into the receptacles as they move into the furnace.

Signed at Toledo, in the county of Lucas and State of Ohio, this 30th day of November, 1928.

CARROLL CONE.